Patented Jan. 22, 1929.

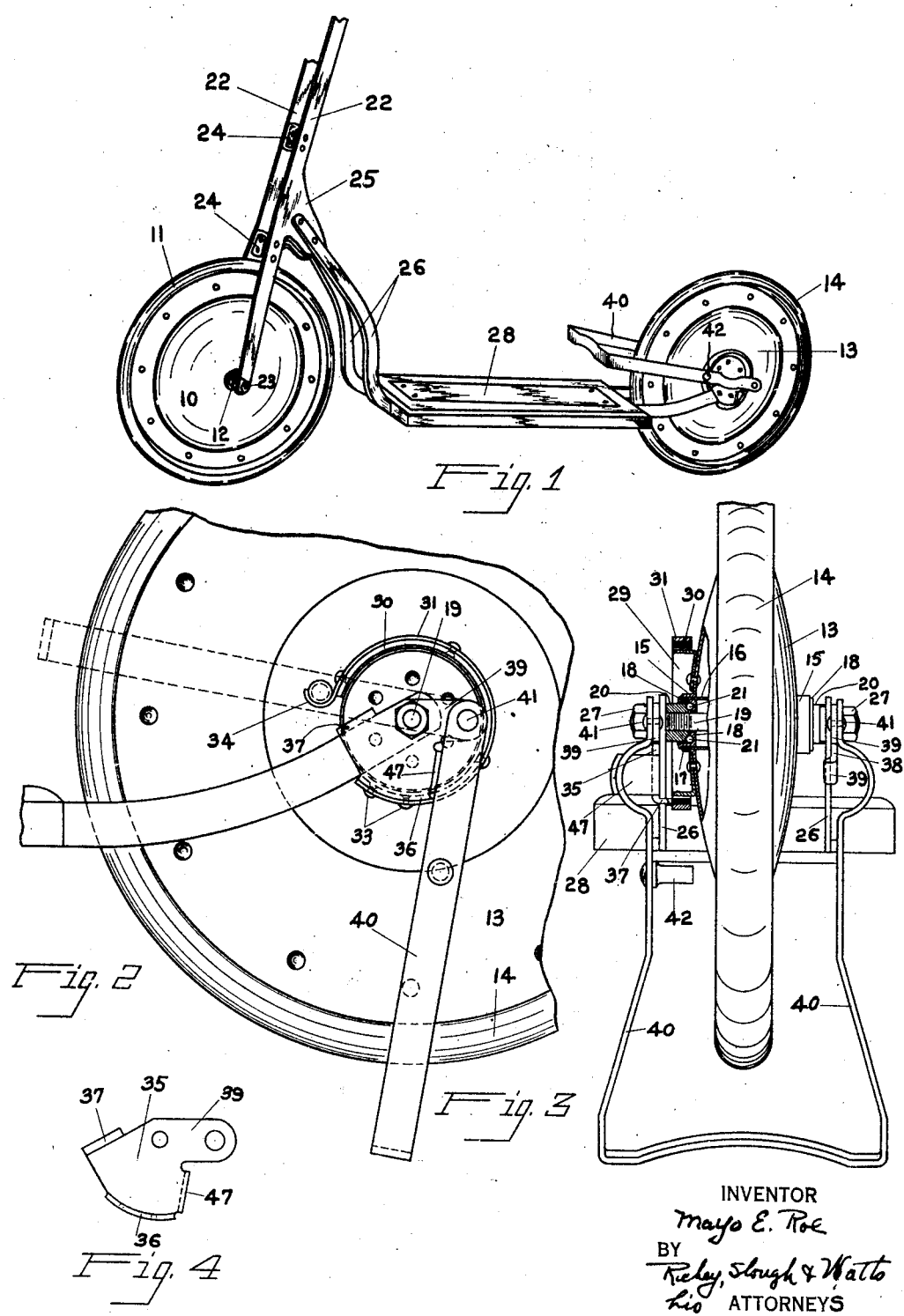

1,700,108

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

COMBINED BRAKE AND STAND FOR TWO-WHEELED VEHICLES.

Application filed July 21, 1924. Serial No. 727,179.

This invention relates to a two wheeled vehicle and more particularly to the type commonly known as scooters.

One of the objects of my invention is to provide brake mechanism for a scooter which can be operated by the foot of the rider.

Another object of my invention is to provide a stand which is carried by a two wheeled vehicle so that it can be thrown down to support the vehicle in an upright position when not being ridden.

Another object of my invention resides in providing, a vehicle of the class described, with a bracket which can be utilized either to support the same in an upright position when not being ridden, or to apply brake mechanism when the vehicle is being ridden.

These and other objects and the invention itself will be clearly set forth in the following detailed description of an embodiment of my invention.

In the drawings Fig. 1 is a perspective side elevation of a scooter embodying my invention in which the bracket is in position to be moved to operate the brake; Fig. 2 is a fragmentary side elevation of the same showing the bracket supporting the vehicle in upright position; Fig. 3 is a rear elevation of the vehicle partially in section to show the brake mechanism; and Fig. 4 is a side elevational view of one of the stand bracket carrying members looking at the inside wall thereof.

Referring now to the drawings by characters of reference 10 represents a front disk wheel having a rubber tire 11 mounted thereupon. An axle 12 extends through the front wheel and is supported by bearings in a similar manner as the rear wheel is, which will be described hereinafter. A rear disk wheel 13 carrying a tire 14 is spaced from the front wheel in longitudinal alignment therewith. The two sides of the disks forming the wheels terminate centrally in circular flanges 15, and a hollow hub 16 is pressed therein and extends axially through the wheel. A thrust bearing 17 lies adjacent each end of the hollow hubs, being provided exteriorly with an outwardly extending flange 18 and interiorly with an inwardly extending flange forming an annular ball race. A solid axle 19 extends through the hollow hub, and a thrust bearing 20 is secrewed upon each end of the axle, being provided with a raceway adapted to cooperate with that of the thrust bearings 17. Ball bearings 21 are mounted intermediate the raceways permitting the wheels to rotate freely upon the axles.

A pair of standards 22 are secured, at their lower ends, upon the axle 12 of the front wheel by nuts 23, and they extend upwardly in parallel relation to support a handle. Braces 24 extend intermediate the standards, above the wheel, and are secured to the standards by rivets. Brackets 25 extend rearwardly from the standards, and parallel frame channels 26 are riveted at their front ends to such brackets. The rear ends of the channels are carried by the axle of the rear wheel, being secured thereupon by nuts 27 which are screwed upon the ends of the axle. A foot board 28 is carried by the frame channels, intermediate the wheels, and preferably in a horizontal plane beneath the axles.

A brake drum 29 is riveted to one side of the rear disk wheel and a brake lining 30 is carried adjacent the exterior periphery thereof by a spring metal brake ring 31. One end of the spring brake ring is secured to a supporting plate 35 by rivets 33 and the other end thereof terminates in a loop 34. The brake ring is curved so that it will normally partially encircle the brake drum in spaced relation therewith, thereby maintaining the brake band slightly removed from the drum.

The plate 35 is secured upon one end of the axle 19 adjacent the frame channel by the nut 27, and is provided with an inturned flange portion 36 to which the end of the brake ring is riveted. The plate is provided with another inturned flange 37 which extends across the top of the frame channel adjacent thereto, to prevent the plate from rotating upon the axle when the brake is applied. A plate 38 is secured upon the other end of the axle 19, adjacent the frame channel, by the nut 27 and is provided with an inturned flange 39 which engages the top of the adjacent frame channel.

Each of the plates 35 and 38 are provided with a rearwardly extending arm 39, arranged in parallel alignment to which the ends of a U shaped bracket stand 40 are pivotally secured by rivets 41. The arms of the bracket straddle the rear wheel, and are of such length that when the base is placed upon the ground the rear wheel will be elevated, thereby maintaining the vehicle in an upright position when so supported. The plate 35 is provided with an outstanding flange 47 against which the bracket stand arm abuts.

This flange extends at an angle so that the bracket will extend forwardly of its pivotal connection when utilized to support the rear end of the vehicle. A stud 42 is secured to one arm of the bracket stand in such relation that it will engage the looped end of the brake ring when thrown forwardly over the wheel. The engagement of the stud with the brake ring will support the bracket when not utilized to support the vehicle. The base of the bracket when retained by the loop extends over the rear end of the foot board, so that the rider can readily place his foot upon the stand to apply the brake. By pressing down upon the base of the bracket 40 the stud will contract the brake ring, causing the brake band to engage the brake drum. It is apparent that the greater the pressure upon the bracket, the tighter the brake will be applied.

It will thus be seen that I utilize the bracket 40 to support the vehicle when thrown down and for applying the brake when in its upper forward position. The brake and the bracket are readily attached and supply a much needed attachment for scooters.

Various changes can be made in the construction of the embodiment described without departing from the spirit of my invention and the scope of the appended claims.

What I claim is:

1. In a two wheel scooter, a brake drum carried by one of said wheels, brake mechanism, and means operable by the foot of the rider for actuating said brake mechanism.

2. In a two wheel scooter having a foot board upon which the rider stands, a brake drum carried by one of said wheels, brake mechanism mounted adjacent said drum, and means extending adjacent said foot board operable by the foot of the rider for applying said brake mechanism.

3. In a two wheel scooter having a foot board upon which the rider stands, a brake drum carried by one of said wheels, brake mechanism mounted adjacent said drum and normally in spaced relation therewith, and a pivotally mounted bracket extending adjacent the foot board and arranged to apply said brake mechanism against said drum when pressed downwardly by the foot of the rider.

4. In a wheeled scooter having a foot board upon which the rider stands, a brake drum secured to one of the wheels of the scooter, a brake partially encircling said drum, one end of said brake being anchored to said scooter, and a pivoted bracket extending adjacent said foot board adapted to contract said brake upon said drum when said bracket is pressed down by the foot of the rider.

5. In a two wheeled scooter having a foot board upon which the rider stands, a brake drum secured to the rear wheel, brake mechanism including a spring metal brake ring and a lining partially surrounding said drum and normally spaced therefrom, means to which one end of said mechanism is anchored, and a bracket extending adjacent said foot board engaging the free end of said brake mechanism, said bracket contracting said brake mechanism upon said drum when pressed down by the foot of the rider.

6. In a two wheeled scooter having a foot board upon which the rider stands, a brake drum secured to the rear wheel, brake mechanism partially encircling said drum, said mechanism including a spring steel band and a lining, means to which one end of said brake mechanism is anchored, said band having a loop formed at its free end, a bracket pivotally secured adjacent said brake mechanism and extending over the rear end of the foot board, and a stud carried by said bracket adapted to engage the looped end of said band, said stud contracting said brake mechanism upon said drum when said bracket is pressed down by the foot of the rider.

7. In a scooter having a pair of wheels, a foot board supported intermediate the wheels, a brake drum secured to the rear wheel, brake mechanism normally arranged in spaced relation with said drum, a bracket pivotally mounted adjacent the rear wheel, said bracket providing a stand for the rear end of the scooter when in its lower position, and means carried by said bracket engaging said brake mechanism to support said bracket in an upper forward position, said bracket extending over the rear end of said foot board when supported by said brake mechanism and being adapted to apply said brake mechanism when actuated by the foot of the rider.

8. In a scooter, a pair of spaced wheels, axles extending through said wheels, a frame intermediate said wheels and supported by said axles, a plate carried by said rear axle having flanges projecting therefrom, one of said flanges extending inwardly and resting upon said frame and the other of said flanges extending outwardly, and a bracket pivotally secured to said plate, said bracket providing a stand for supporting the rear end of the scooter when in its lower forward position in engagement with the outwardly extending flange on said plate.

9. In a scooter, a pair of spaced wheels, axles extending through said wheels, a frame intermediate said wheels and supported by said axles, a plate carried on each end of the rear axle, nuts screwed upon said axle to retain said plates thereon, flanges extending from said plates over the adjacent frame, and a bracket straddling the rear wheel having its ends pivotally secured to said plates, said bracket providing a stand for supporting the rear end of the scooter when in its lower forward position.

10. In a vehicle of the class described, a frame, front and rear supporting wheels for the frame, a platform on the frame between the wheels, brake means carried by the frame for engagement with the rear wheel, and a supporting standard for the vehicle pivoted to the rear end of the frame and when in inoperative position having engagement with the brake means, and having a portion disposed in position to be engaged by the heel of a foot resting on the platform and operated thereby to impart wheel engaging movements to the brake means.

11. In a vehicle of the class described, a frame, a brake means carried by the frame and operable to have braking engagement with the rear wheel, and a supporting standard for the vehicle pivoted to the rear end of the frame and when in inoperative supporting position having connection with the brake means and being depressible to impart braking movements to said means.

12. In a juvenile vehicle, the combination of an elongated frame; wheels, one a steering wheel, mounted in said frame and adapted movably to support the same; a brake-member carried by said frame and adapted to contact with a wheel other than said steering wheel but normally standing clear of said wheel; and a movable member associated with said wheel and adapted in one position to act as a stand for the vehicle and in another position operatively to engage said brake-member.

13. In a juvenile vehicle, the combination of an elongated frame; wheels, one a steering wheel, mounted in said frame and adapted movably to support the same; a resilient plate mounted on said frame in proximity to a wheel other than said steering wheel, said plate being normally out of contact with said wheel; and a movable member associated with said wheel and adapted in one position to act as a stand for the vehicle and in another position to engage said plate and press the same against said wheel.

14. A child's vehicle having a combined brake actuator and stand mounted for movement to two distinct positions to perform its two functions.

15. In a scooter having a pair of longitudinally aligned wheels, a connecting frame and a frame supported foot board disposed intermediate the wheels and upon which the rider may stand, brake mechanism associated with a non-steering wheel of the scooter, a swinging lever carried by the scooter frame and having a pedal portion adapted to be operated by the rider to apply the brake mechanism and adapted to be swung from braking position to a scooter supporting position, said lever having ground engaging portions disposed on each side of the wheel.

16. In a two-wheeled scooter mechanism, a pair of longitudinally aligned supporting wheels, a frame joining the wheels, a foot board carried by the frame intermediate the wheels, brake mechanism associated with one of the wheels, the other wheel being a steering wheel, a lever adapted to actuate the brake mechanism and having a plurality of operative positions, one of said positions being a vehicle braking position and another of said positions being a vehicle supporting position.

17. In a two-wheeled scooter mechanism, a pair of longitudinally aligned supporting wheels, a frame joining the wheels, a foot board carried by the frame intermediate the wheels, brake mechanism associated with one of the wheels, the other wheel being a steering wheel, a lever adapted to actuate the brake mechanism pivoted laterally of the first wheel but eccentrically thereto and having a plurality of operative positions, one of said positions being a vehicle braking position and another of said positions being a vehicle supporting position.

18. In a combined brake and stand for a scooter vehicle, the combination with a rigid loop adapted to be pivoted at its ends to the vehicle frame near the rear wheel axle and to be capable of taking different rotative positions about its pivot, said loop in certain of said positions adapted to be operative as a brake lever, and in another of said positions adapted to support the rear end of the vehicle independently of the rear wheel thereof.

19. In a combined brake and stand for a scooter vehicle the combination with a rigid loop adapted to be pivoted at its ends to the vehicle frame near the rear wheel axle and to be capable of taking different rotative positions about its pivot, said loop in certain of said positions adapted to be operative as a brake lever, and in another of said positions adapted to support the rear end of the vehicle independently of the rear wheel thereof, and a stop on the frame for limiting the rotative movement of the loop beyond vehicle supporting position, said stop being disposed in the rotative path of the loop so as to hold the loop with its ground engaging portion slightly in advance of the vertical plane of the loop pivots.

20. In a two-wheeled scooter mechanism, a pair of longitudinally aligned supporting wheels, a frame joining the wheels, a foot board carried by the frame intermediate the wheels, brake mechanism associated with one of the wheels, the other wheel being a steering wheel, a lever movable to brake mechanism operating position and to a vehicle supporting position, and stop means adapted to hold the lever in vehicle supporting position.

21. In a two-wheeled scooter mechanism, a pair of longitudinally aligned supporting wheels, a frame joining the wheels, a foot board carried by the frame intermediate the wheels, brake mechanism associated with one of the wheels, the other wheel being a steering wheel, a lever pivoted adjacent to the axle of the first wheel but eccentrically thereof and having a plurality of operative positions, one of said positions being a brake mechanism operating position, another of said positions being a vehicle supporting position and a third position, and means to normally hold the lever in such third position.

22. In a two-wheeled scooter mechanism, a pair of longitudinally aligned supporting wheels, a frame joining the wheels, a foot board carried by the frame intermediate the wheels, brake mechanism associated with one of the wheels, the other wheel being a steering wheel, a swinging lever pivoted adjacent the axle of the rear wheel and having a plurality of operative positions, one of said positions being a braking mechanism operating position and another of said positions being a vehicle supporting position.

23. In a two-wheeled scooter mechanism, a pair of longitudinally aligned supporting wheels, a frame joining the wheels, a foot board carried by the frame intermediate the wheels, brake mechanism associated with one of the wheels, the other wheel being a steering wheel, lever mechanism movable to a plurality of operative positions, one of said positions being a brake mechanism operating position and another position being a vehicle supporting position.

24. In a scooter having a pair of longitudinally aligned wheels and a foot board supported intermediate thereof upon which the rider stands, brake mechanism associated with the rear wheel of the scooter, and a lever carried by the scooter laterally of the rear wheel, said lever providing a stand for the rear end of the scooter when moved to a lower position and being adapted to be operated by the rider to apply said brake mechanism when in an upper forward position.

25. In a scooter having a pair of aligned wheels and a foot board supported intermediate thereof upon which the rider stands, brake mechanism associated with the rear wheel of said scooter, and a swinging lever movable to a downward position to provide a stand for the rear end of the scooter and adapted to be operated by the rider to apply said brake mechanism when in an upper forward position.

26. In a scooter having a pair of aligned wheels and a foot board supported intermediate thereof, brake mechanism associated with the rear wheel, and a pivotally mounted lever adjacent the rear wheel for supporting the rear end of the scooter when in its lower position, said brake mechanism supporting the lever when not in use as a support.

27. In combination with a coaster having a platform suspended between the two wheels, a brake for the rear wheel, and a pivoted stand member adapted to be swung into position to serve as the pedal member for operating said brake.

28. A two wheeled vehicle including a steering wheel and a rear wheel, a platform upon which the operator stands disposed intermediate the wheels, and a brake element attached at one end to the frame in substantially eccentric relation with and extending beyond the tread of the wheel, said brake element having its free end adjacent the platform and adapted for engagement by the heel of the operator for applying braking pressures to the wheel.

In testimony whereof I hereunto affix my signature this 8th day of July, 1924.

MAYO E. ROE.